US011920349B2

(12) United States Patent
Jackson

(10) Patent No.: US 11,920,349 B2
(45) **Date of Patent: *Mar. 5, 2024**

(54) LOUVERED PATIO COVER

(71) Applicant: JACKSON DESIGN & REMODELING, INC., San Diego, CA (US)

(72) Inventor: Todd Raymond Jackson, San Diego, CA (US)

(73) Assignee: JACKSON DESIGN & REMODELING, INC., San Diego, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/721,245

(22) Filed: Apr. 14, 2022

(65) Prior Publication Data

US 2022/0235553 A1 Jul. 28, 2022

Related U.S. Application Data

(63) Continuation of application No. 16/743,707, filed on Jan. 15, 2020, now Pat. No. 11,326,349.

(51) Int. Cl.

*E04D 13/03* (2006.01)
*E04B 7/16* (2006.01)
(Continued)

(52) U.S. Cl.

CPC .......... *E04D 13/0354* (2013.01); *E04B 7/163* (2013.01); *E04D 13/0305* (2013.01);
(Continued)

(58) Field of Classification Search

CPC ......... E04H 4/0043; E04H 4/005; E04H 4/08; E04H 4/082; E04D 13/15; E04D 13/0325;
(Continued)

(56) References Cited

U.S. PATENT DOCUMENTS 3,748,461 A 7/1973 Wilson et al.
6,363,662 B1 4/2002 Coates
(Continued)

FOREIGN PATENT DOCUMENTS

CN 207829767 U * 9/2018
CN 111335678 A * 6/2020 ............. E04B 13/00
(Continued)

*Primary Examiner* — Ryan D Kwiecinski
(74) *Attorney, Agent, or Firm* — Pillsbury Winthrop Shaw Pittman LLP; Peter K. Hahn; Jeffrey T. Sheriff

(57) ABSTRACT

This disclosure relates to a louvered patio cover. The louvered patio cover may comprise a frame with support beams, louvered panels, support beam couplers, an actuator, a gutter, and/or other components. The support beams may have angled ends. The louvered panels may be rotatably coupled to the support beams. A support beam coupler may comprise first and second receivers. The first receiver may be configured to receive an angled end of a first support beam, and the second receiver may be configured to receive an angled end of a second support beam. The angled ends of the first and second support beams may face, meet, and/or abut each other when received by the first and second receivers. The actuator may be configured to rotate the louvered panels. A gutter may comprise a lighting channel configured to hold a light source for lighting an area under the louvered patio cover.

20 Claims, 8 Drawing Sheets

(51) Int. Cl.

| | |
|---|---|
| ***E04D 13/035*** | (2006.01) |
| ***E04D 13/064*** | (2006.01) |
| ***F21V 33/00*** | (2006.01) |
| *E04D 13/17* | (2006.01) |
| *E04H 4/08* | (2006.01) |
| *F21W 121/00* | (2006.01) |
| *F21W 131/10* | (2006.01) |

(52) U.S. Cl.

CPC ....... *E04D 13/0325* (2013.01); *E04D 13/064* (2013.01); *F21V 33/006* (2013.01); *E04D 13/17* (2013.01); *E04H 4/082* (2013.01); *F21W 2121/004* (2013.01); *F21W 2131/10* (2013.01)

(58) Field of Classification Search

CPC .............. E04D 13/033; E04D 13/0351; E04D 13/0354; E04D 13/064; E04B 7/163; F21V 33/006; E04F 10/08; E04F 10/10; E06B 7/084; E06B 7/086; F21W 2121/004; F21W 2131/10

See application file for complete search history.

(56) References Cited

U.S. PATENT DOCUMENTS

| | | | | | |
|---|---|---|---|---|---|
| 6,536,165 | B2 | 3/2003 | Pilcher | | |
| 6,572,239 | B1 | 6/2003 | Harbin | | |
| 6,918,680 | B2 | 7/2005 | Seeberger | | |
| 6,955,458 | B2 | 10/2005 | Cheema | | |
| 7,344,265 | B1 | 3/2008 | Tieken | | |
| 8,322,598 | B1 * | 12/2012 | Farentinos | A47G 29/1216 | 248/219.2 |
| 8,572,905 | B1 * | 11/2013 | Driggers | E02D 27/42 | 52/298 |
| 8,956,000 | B2 | 2/2015 | Martinez | | |
| 9,422,715 | B1 * | 8/2016 | Selzer | E04D 11/00 | |
| 10,273,750 | B2 * | 4/2019 | Fleischman | E04B 2/7433 | |
| 10,676,936 | B2 * | 6/2020 | Lemiegre | E04F 10/00 | |
| 10,815,689 | B2 * | 10/2020 | Ji | E04F 10/10 | |
| 10,851,544 | B1 * | 12/2020 | Volin | E04F 10/08 | |
| 10,858,819 | B2 * | 12/2020 | Styrc | F16M 11/24 | |
| 11,174,630 | B2 * | 11/2021 | Bowron | E04B 1/34838 | |
| 2005/0225982 | A1 | 10/2005 | Hahn | | |
| 2013/0291438 | A1 | 11/2013 | Selzer | | |
| 2013/0306808 | A1 * | 11/2013 | Huang | A47B 13/06 | 248/163.1 |
| 2014/0175240 | A1 | 6/2014 | Selzer | | |
| 2021/0214942 | A1 * | 7/2021 | Lacas | A01G 9/28 | |

FOREIGN PATENT DOCUMENTS

| | | | | | |
|---|---|---|---|---|---|
| CN | 111946104 | A * | 11/2020 | E04B 1/163 |
| EP | 3301240 | A1 * | 4/2018 | |
| FR | 3090807 | A1 * | 6/2020 | |
| WO | WO-2016189450 | A1 * | 12/2016 | E04C 3/07 |
| WO | WO-2018054701 | A1 * | 3/2018 | |
| WO | WO-2018054702 | A1 * | 3/2018 | |

* cited by examiner

FIG. 4C
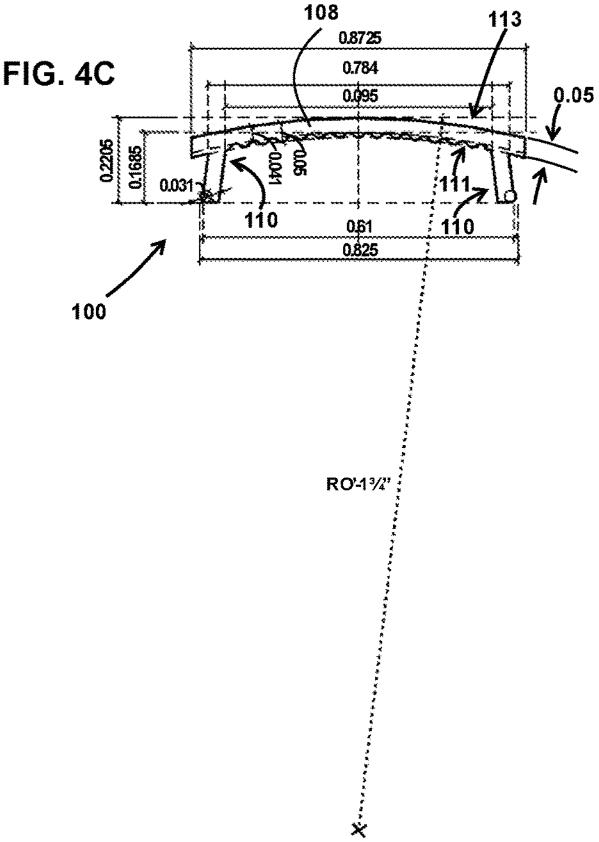
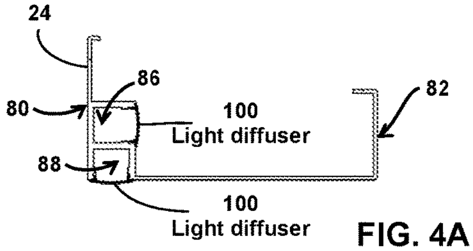
FIG. 4A
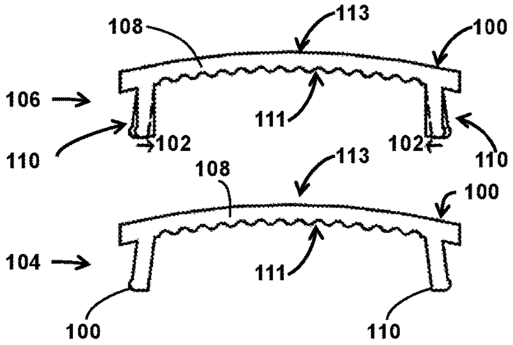
FIG. 4B

LOUVERED PATIO COVER

CROSS-REFERENCE TO RELATED APPLICATION

This application is a continuation application of U.S. patent application Ser. No. 16/743,707, titled LOUVERED PATIO COVER, filed Jan. 15, 2020, which is expressly incorporated herein by reference in its entirety.

FIELD OF THE DISCLOSURE

This disclosure relates to a louvered patio cover.

BACKGROUND

Louvered patio covers are known. Louvered patio covers are often installed over an area designed for seating, tables, and/or other objects, to create an outdoor living space. Louvered patio covers are designed to be aesthetically pleasing, and function as at least a partial shelter from the ambient environment. However, typical louvered patio covers do not include gutters or gutter lighting channels. Also, typical louvered patio covers have visible corner connectors that connect beams of a louvered patio cover frame. This decreases the aesthetic appearance of typical louvered patio covers.

SUMMARY

One aspect of the disclosure relates to a louvered patio cover. The louvered patio cover may comprise a frame with support beams, louvered panels, one or more support beam couplers, an actuator, one or more gutters, and/or other components. The support beams may have angled ends. The louvered panels may be rotatably coupled to the support beams. A support beam coupler may comprise first and second receivers. The first receiver may be configured to receive an angled end of a first support beam. The second receiver may be configured to receive an angled end of a second support beam. The angled ends of the first and second support beams may face or abut each other when received by the first and second receivers. The actuator may be mounted to the frame and coupled to the louvered panels. The actuator may be configured to rotate the louvered panels between an open configuration and a closed configuration (and/or intermediate configurations between the open configuration and the closed configuration).

In some implementations, the one or more gutters may be coupled to the frame. A gutter may comprise a lighting channel and/or other components. The gutter may be configured to hold a light source for lighting an area under the louvered patio cover. In some implementations, the lighting channel may open toward an interior of the gutter. In some implementations, the gutter may comprise two lighting channels, with a first lighting channel opening toward an interior of the gutter, and a second lighting channel opening toward a ground surface below the louvered patio cover when the gutter is coupled to the frame.

In some implementations, the actuator may be configured such that the open configuration allows ambient light to pass between the louvered panels, and the closed configuration blocks light from passing between the louvered panels. In some implementations, the actuator may be configured to rotate individual louvered panels in unison between the open configuration and the closed configuration.

In some implementations, the support beams may be hollow or partially hollow. For example, the support beams may have hollow ends and/or other hollow areas.

In some implementations, the louvered patio cover may comprise vertically oriented support posts configured to support the frame. In some implementations, the first and second support beams may be horizontally oriented and supported by the vertically oriented support posts. In some implementations, a support beam coupler may be attached to a vertically oriented support post. In some implementations, the one or more support beam couplers may be located at corners of the frame.

In some implementations, the first and second receivers are located on adjacent surfaces of the support beam coupler. In some implementations, the first and second support beams conceal the support beam coupler when viewed from an area within the louvered patio cover.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A illustrates two different light diffusers coupled to channels of the gutter, in accordance with one or more implementations.

FIG. 4B illustrates how a light diffuser may be configured to flex to facilitate placement in a channel, in accordance with one or more implementations.

FIG. 4C illustrates several example dimensions of a light diffuser, in accordance with one or more implementations.

DETAILED DESCRIPTION

Figure 1A:
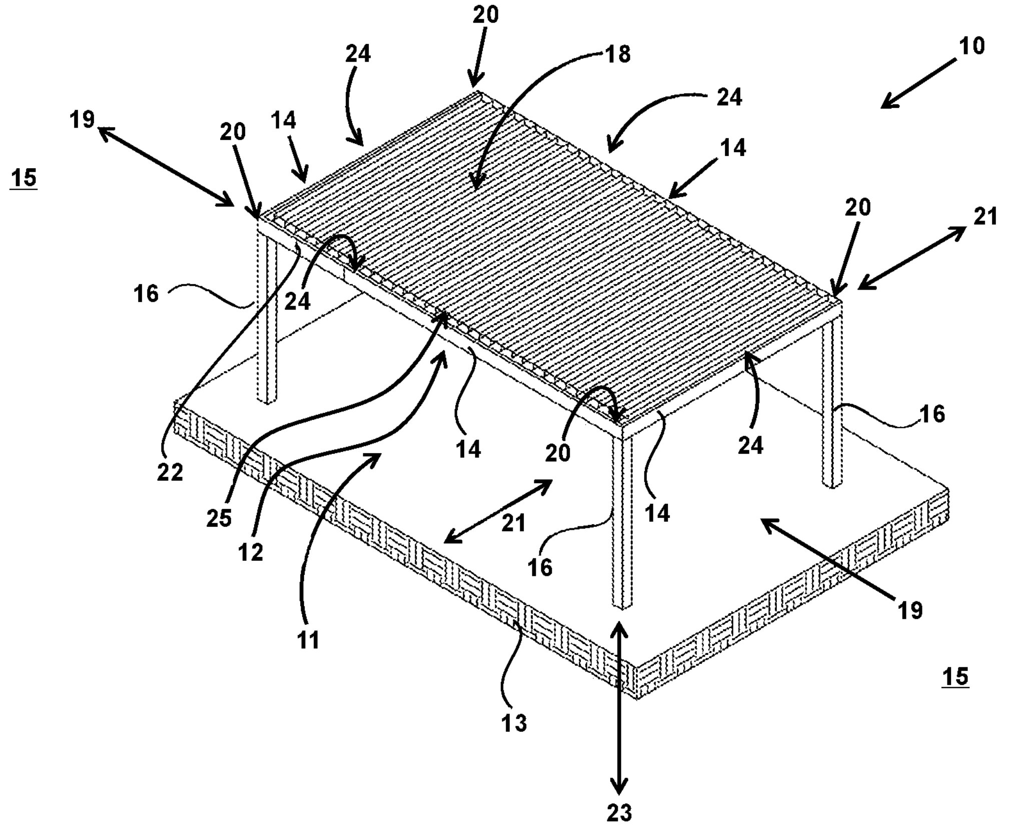
FIG. 1A illustrates a louvered patio cover, in accordance with one or more implementations.

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the implementations of the disclosure described herein, and any equivalents. Furthermore, reference to various aspects of the disclosure throughout this document does not mean that all claimed implementations or methods must include the referenced aspects.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the statement that two or more parts or components "engage" one another shall mean that the parts exert a force against one another either directly or through one or more intermediate parts or components. Directional phrases used herein, such as, for example and without limitation, top, bottom, left, right, upper, lower, front, back, above, below, and derivatives thereof, relate to the orientation of the elements shown in the drawings and are not limiting upon the claims unless expressly recited therein.

Figure 1B:
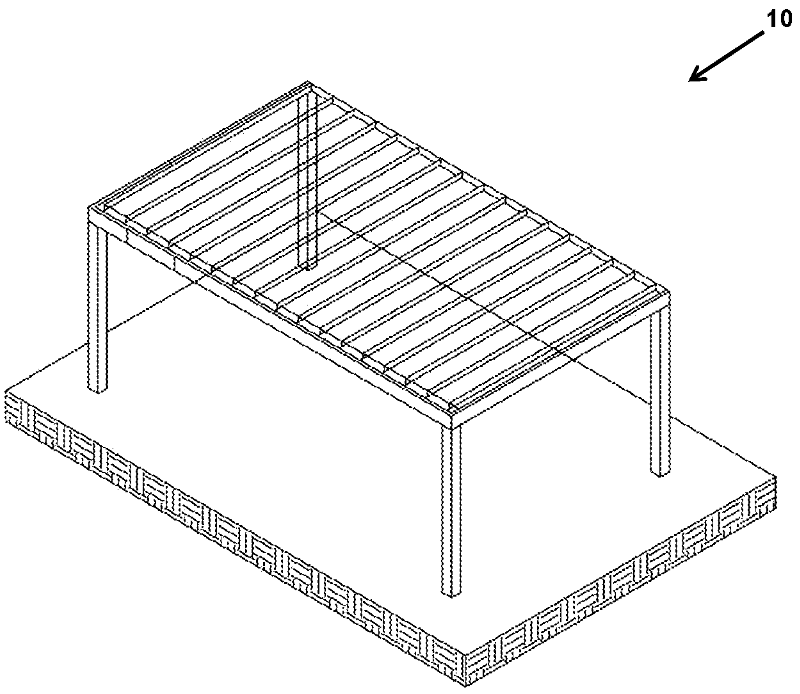
FIG. 1B illustrates the louvered patio cover in an open configuration, in accordance with one or more implementations.
Figure 1C:
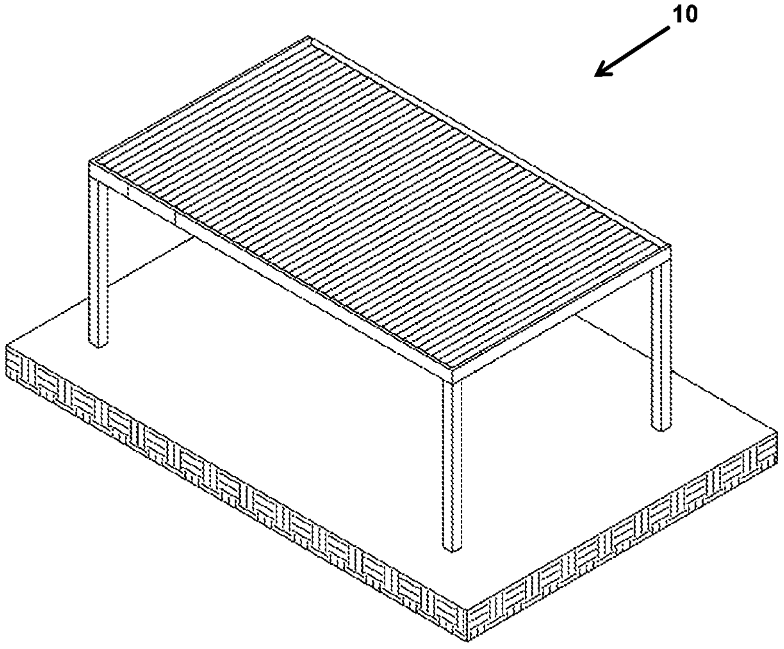
FIG. 1C illustrates the louvered patio cover in a closed configuration, in accordance with one or more implementations.

FIGS. 1A, 1B, and 1C (collectively FIG. 1) illustrate a louvered patio cover 10. Louvered patio cover 10 is illustrated in FIG. 1 installed over an area 11 designed for seating, tables, and/or other objects, to create an outdoor living space. In the example shown in FIG. 1, louvered patio cover 10 is shown installed over a patio 13. Patio 13 may be formed from cement and/or concrete, wood, earth, grass, gravel, and/or other materials. Louvered patio cover 10 may be configured to be aesthetically pleasing, and function as at least a partial shelter from the ambient environment 15. Advantageously, louvered patio cover 10 may include gutters 24 with gutter lighting channels (not shown in FIG. 1, but described below). Also, louvered patio cover 10 may have support beam couplers 20 that couple support beams 14 of louvered patio cover 10 such that support beam couplers 20 are concealed from view. This may increase the aesthetic appearance of louvered patio cover 10. In some implementations, louvered patio cover 10 may comprise a frame 12 with support beams 14, support posts 16, louvered panels 18, one or more support beam couplers 20, an actuator 22, one or more gutters 24, and/or other components.

Frame 12 may be and/or form a support structure for louvered panels 18, actuator 22, and/or other components of louvered patio cover 10. In some implementations, frame 12 may form a perimeter of louvered patio cover 10. Frame 12 may have a generally rectangular shape (e.g., as shown in FIG. 1) and/or other shapes. Frame 12 may be formed by a plurality of support beams 14 and/or other components. Frame 12 may be formed by coupling the ends of support beams 14 together. For example, as shown in FIG. 1, four support beams 14 may be coupled together to form the generally rectangular shape of frame 12. Continuing with this example, an individual support beam 14 may be coupled to two other support beams 14, one at either end of the individual support beam 14. Frames 12 having other quantities of support beams 14 joined to form the same (e.g., generally rectangular) or other frame 12 shapes (e.g. generally square, triangular, pentagonal, hexagonal, octagonal, etc.) are contemplated.

As described above, support beams 14 may be coupled together to form frame 12 and/or be used for other purposes. In some implementations, support beams 14 may have a length that extends along a primary longitudinal axis 19 or 21 and a thickness that extends along a secondary transverse axis (not specifically labeled in FIG. 1). In some implementations (e.g., when frame 12 has a generally rectangular shape), pairs of support beams 14 may have substantially the same length, with a first pair having a length that is longer than a length of a second pair of support beams 14. These pairs of support beams 14 may be coupled to form a rectangle (e.g., as illustrated in FIG. 1), with beams of the same length on opposite sides of the rectangle. In some implementations (e.g., when frame 12 has a generally square and/or other shapes), support beams 14 may have the same length. In some implementations, support beams 14 may have a rectangular cross section and/or other cross sections. In some implementations, support beams 14 may be solid or hollow. In some implementations, support beams 14 may be partially hollow. For example, support beams 14 may have hollow ends and/or other hollow areas. In some implementations, support beams 14 may be formed from metal, wood, and/or other materials.

Support posts 16 may be configured to support frame 12 and/or other components. Support posts 16 may be vertically oriented, for example, and/or have other orientations. Support posts 16 may be fixedly or movably coupled to a patio 13, a ground surface, and/or any other support surface. In some implementations, support posts 16 may rest on patio 13, a ground surface, or another support surface without being fixedly or movably coupled to such a surface. In some implementations, support posts 16 may have a length that extends along a primary longitudinal axis 23 and a thickness that extends along a secondary transverse axis (not specifically labeled in FIG. 1). In some implementations (e.g., when frame 12 has a generally rectangular shape), support posts 16 may include four support posts 16 having substantially the same length. Support posts 16 may be positioned at or near the corners of the generally rectangular shape formed by frame 12 (e.g., as illustrated in FIG. 1). In some implementations (e.g., when frame 12 has a generally triangular and/or other shapes), more or less support posts 16 may be required. In some implementations, support posts 16 may have a generally square cross section, rectangular cross section, and/or other cross sections. In some implementations, support posts 16 may be solid or hollow. In some implementations, support posts 16 may be formed from metal, wood, and/or other materials.

Support beam couplers 20 may be configured to couple (two) support beams 14 together. Support beam couplers 20 may be located at or near the (upper) ends of support posts 16, opposite a ground or patio 13 surface. In the example shown in FIG. 1, support beam couplers 20 are shown located at or near the corners of frame 12, proximate to support posts 16. In some implementations, support beam couplers 20 may be directly coupled to support posts 16. In some implementations, support beam couplers 20 may be indirectly coupled to support posts 16 via other components.

Figure 2A:
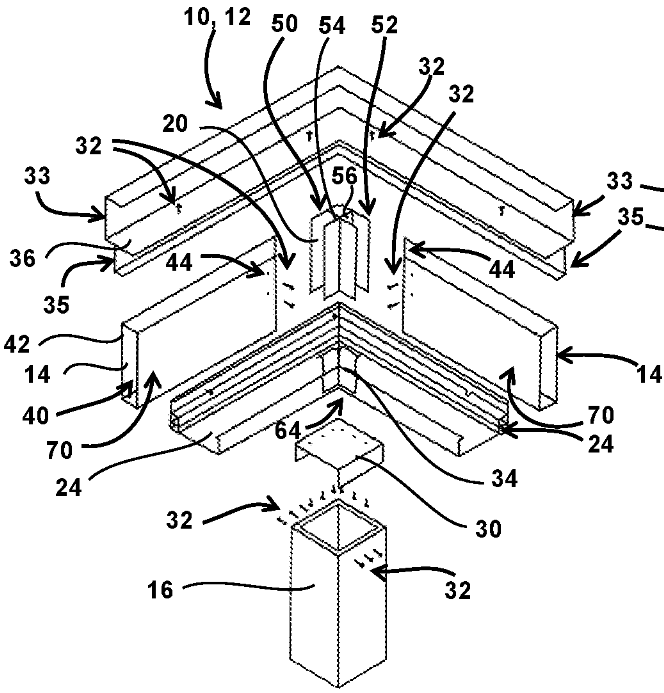
FIG. 2A illustrates an exploded view of a support beam coupler, a support post, two support beams, and other components, in accordance with one or more implementations.

For example, FIG. 2A illustrates an exploded view of a support beam coupler 20, a support post 16, two support beams 14, and other components. As shown in FIG. 2A, support beam coupler 20 may be coupled to support post 16 via a cap connection 30; various screws, nuts, bolts, clips, clamps, adhesive, and/or other coupling mechanisms 32; one or more corner brackets 34, and/or other components.

Support beams 14 may be hollow 40, or partially hollow (e.g., hollow ends), and have a rectangular cross section 42 and/or other cross sections. Support beams 14 may also have angled ends 44. An angled end 44 may comprise an end surface (or outline of a surface for hollow beams) of a support beam 14 that is not perpendicular to an elongated body (e.g., elongated along axis 19 or 21 shown in FIG. 1) of the support beam 14. In the example shown in FIG. 2A, angled ends have an angle of about 45 degrees relative to a (hypothetical) straight cut (e.g., perpendicular) end of a support beam 14, and/or the elongated body of a support beam 14.

Support beam coupler 20 may comprise first 50 and second 52 receivers. In some implementations, first 50 and second 52 receivers may be located on adjacent surfaces 54 and 56 of support beam coupler 20. In some implementations, first 50 and second 52 receivers may comprise pairs of tabs or plates (e.g., as shown in FIG. 2A) that extend from adjacent surfaces 54 and 56 of support beam coupler 20 along a vertical axis of support beam coupler 20. The pairs of tabs or plates may be spaced such that they both fit inside a hollow end of a support beam 14. In some implementations, first and second receivers 50 and 52 may be formed by blocks and/or other configurations of material (e.g., a solid structure not formed by different tabs or plates) that protrude from adjacent surfaces 54 and 56 and fit inside the hollow ends of support beams 14. In some implementations, the pairs of tabs or plates, the blocks, and/or other receivers may be configured to facilitate a friction fit against corresponding interior surfaces of a hollow support beam 14. Other receiving mechanisms are contemplated.

First receiver 50 may be configured to receive an angled end 44 of a first support beam 14. Second receiver 52 may be configured to receive an angled end 44 of a second support beam 14. The ends (e.g., at or near angled ends 44) of support beams 14 may be coupled to the pairs of tabs or plates (e.g., first and second receivers 50 and 52) via screws, nuts, bolts, orifices in support beams 14, orifices in the pairs of tabs or plates, clips, clamps, and/or other coupling mechanisms. Angled ends 44 of the first and second support beams 14 may face, meet, and/or abut each other when received by the first 50 and second 52 receivers. In some implementations, angled ends 44 may engage, meet, and/or abut each other when support beams 14 are coupled to receivers 50 and 52.

In some implementations, support beam coupler 20 may be formed from metal, a polymer, wood, and/or other materials. For example, support beam coupler 20 may be formed from one or more pieces of sheet metal. In some implementations, support beam coupler 20 may be solid, hollow, or have other configurations. In some implementations, support beam coupler 20 may have a hollow central portion, for example. The hollow central portion, the material used to form support beam coupler 20, and/or other characteristics of support beam coupler 20 may be configured to make support beam coupler 20 relatively light and strong.

In some implementations, frame 12 may include a cornice 36. Cornice 36 may have any shape and/or dimensions that enhance the aesthetic appearance of frame 12 and/or perform other functions. Cornice 36 may be configured to be coupled with support beams 14 and/or a support beam coupler 20 via various screws, nuts, bolts, clips, clamps, adhesive, and/or other coupling mechanisms 32. Cornice 36 may be formed from metal, polymers, wood, and/or other materials. In some implementations, for example, cornice 36 may be formed from one or more relatively thin pieces of sheet metal, bent and/or heat treated into specific shapes. In some implementations, cornice 36 may be coupled to an upper side of one or more of the support beams 14 of frame 12, and/or be coupled to frame 12 in other locations.

In some implementations, cornice 36 may have a layered structure, with a first larger layer 33 positioned above (relative to a ground surface) a second smaller layer 35. Layers 33 and/or 35 may be substantially "C" or "L" shaped (e.g., as shown in FIG. 2A), and/or have other shapes. In some implementations, an open portion of the "C" or "L" shapes may face an interior of louvered patio cover 10 when cornice 36 is coupled to support beams 14. In some implementations, cornice 36 may be configured to enhance an aesthetic appearance of frame 12 and/or serve other purposes. In some implementations, cornice 36 may be configured to enhance an aesthetic appearance of frame 12 by modifying a sharp, perpendicular, angular appearance of (e.g., an upper edge of) support beams 14, for example.

Figure 2B:
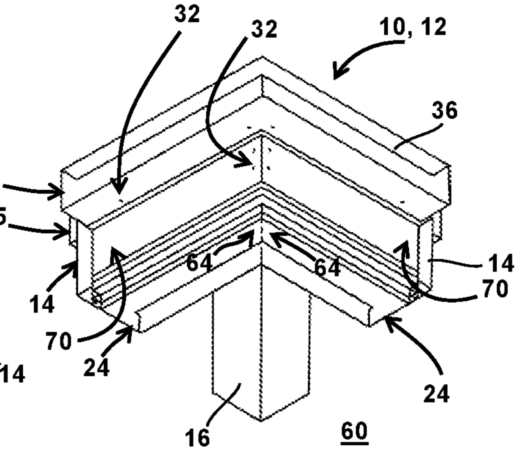
FIG. 2B illustrates an assembled view of the components shown in FIG. 2A, in accordance with one or more implementations.
Figure 2C:
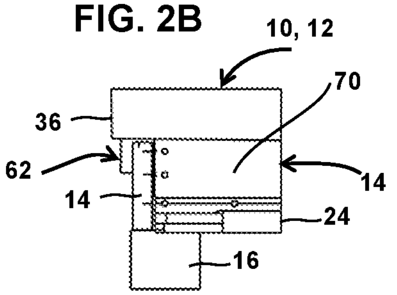
FIG. 2C illustrates a side view of the assembled components shown in FIG. 2A, in accordance with one or more implementations.

FIG. 2B illustrates an assembled view of the components shown in FIG. 2A. As shown in FIG. 2B, in some implementations, the first and second support beams 14 conceal the support beam coupler 20 (not visible in FIG. 2B) when viewed from an area 60 within the louvered patio cover 10. By way of a non-limiting example, the first and second support beams 14 may be horizontally oriented and supported by the vertically oriented support post 16. In some implementations, a support beam coupler (20—not visible in FIG. 2B) may be (indirectly) attached to a vertically oriented support post 16 (e.g., as described above). In some implementations, the one or more support beam couplers 20 may be located at corners of the frame 12 such that the assembled components for a clean, visually pleasing assembly. FIG. 2C illustrates a side view of the assembled components shown in FIGS. 2A and 2B in a corner 62 of frame 12.

Gutters 24 are illustrated in FIGS. 2A, 2B, and 2C. A gutter 24 may be coupled to support beams 14, support beam coupler 20, corner bracket 34, cap connection 30, support post 16, and/or other components of frame 12 and/or louvered patio cover 10. Gutter 24 may be coupled via various screws, nuts, bolts, clips, clamps, adhesive, and/or other coupling mechanisms 32. In some implementations, gutters 24 may be formed from metal, polymers, and/or other materials. For example, gutters 24 may be formed from one or pieces of sheet metal and/or other materials. In some implementations, gutters 24 may be formed from one or more relatively thin pieces of sheet metal, bent and/or heat treated into specific shapes such as the shapes shown in FIGS. 2A and 2B. As another example, gutters 24 may be extruded from a hot liquid of aluminum through a mold and come out in one piece in different lengths (e.g., usually 24'-30'). They may be cut to size to fit with and be coupled to a beam. Gutters 24 may be coupled to frame 12 and/or louvered patio cover 10 on interior surfaces 70 of support beams 14 and/or in other locations. Gutters 24 may be installed around the interior perimeter of the beams such that as water runs off the louvers, the water is caught in gutters 24. Gutters 24 may include one or more drains such that the water then runs out of the gutters.

Gutters 24 may have angled ends 64. An angled end 64 may comprise an end of a gutter 24 that is not perpendicular to an elongated body (e.g., elongated along axis 19 or 21 shown in FIG. 1) of a gutter 24. In the example shown in FIG. 2A, angle ends have an angle of about 45 degrees relative to a (hypothetical) straight cut (e.g., perpendicular) end of a gutter 24. As shown in FIG. 2B, in some implementations, angled ends 64 of gutters 24 may meet at corners of the frame 12 such that the assembled components for a clean, visually pleasing assembly. In some implementations, gutters 24 may be formed from metal and/or other materials as described above.

Figures 3A, 3B, 3C:
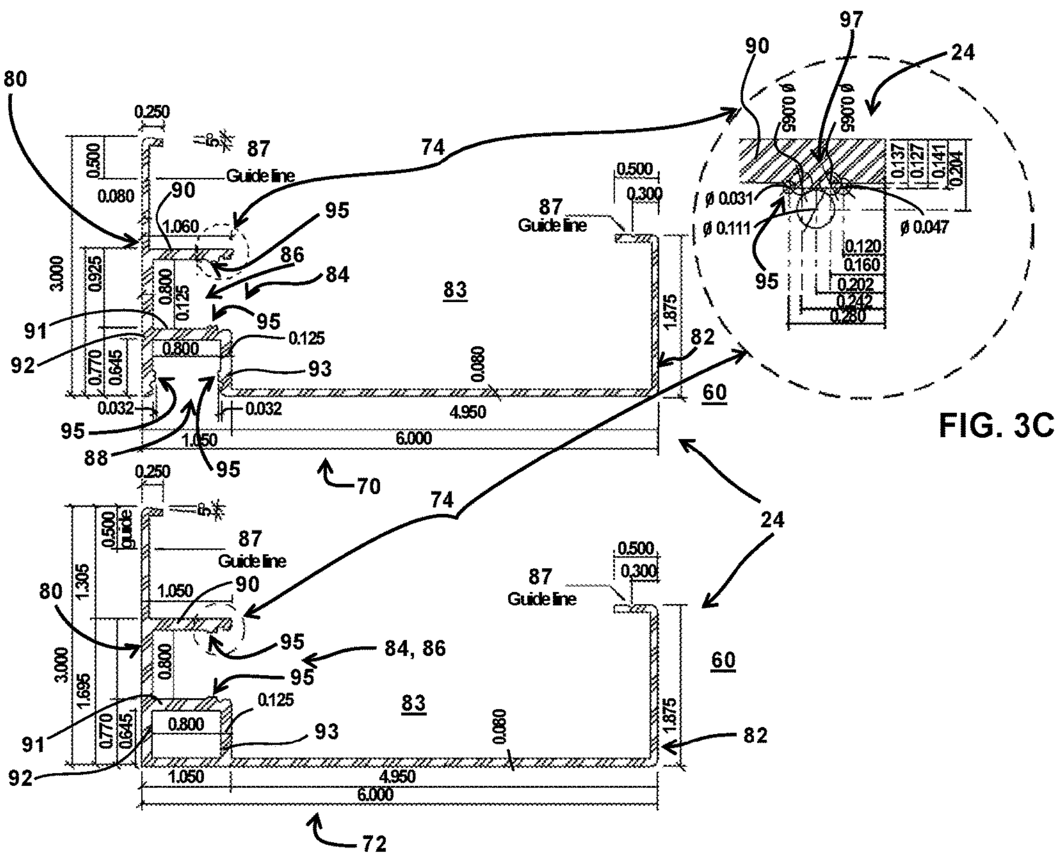
FIG. 3A illustrates a first example cross sectional profile for a gutter of the louvered patio cover, in accordance with one or more implementations.
FIG. 3B illustrates a second example cross sectional profile for the gutter of the louvered patio cover, in accordance with one or more implementations.
FIG. 3C is an enlarged view of a portion of the cross sectional profiles shown in FIGS. 3A and 3B, in accordance with one or more implementations.
Figure 3D:
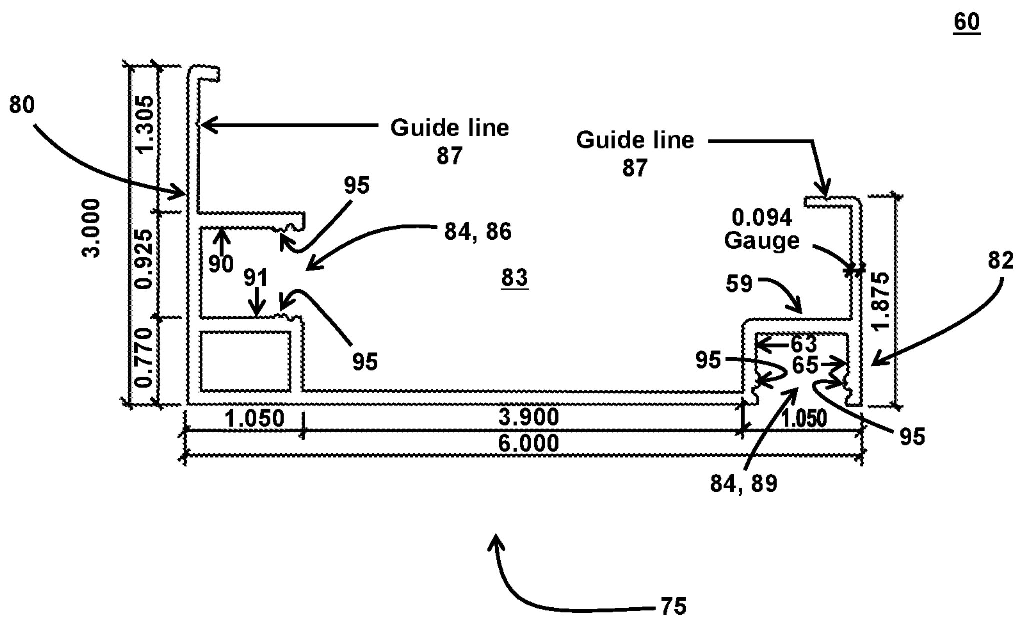
FIG. 3D illustrates a third example cross sectional profile for a gutter of the louvered patio cover, in accordance with one or more implementations.
Figure 3E:
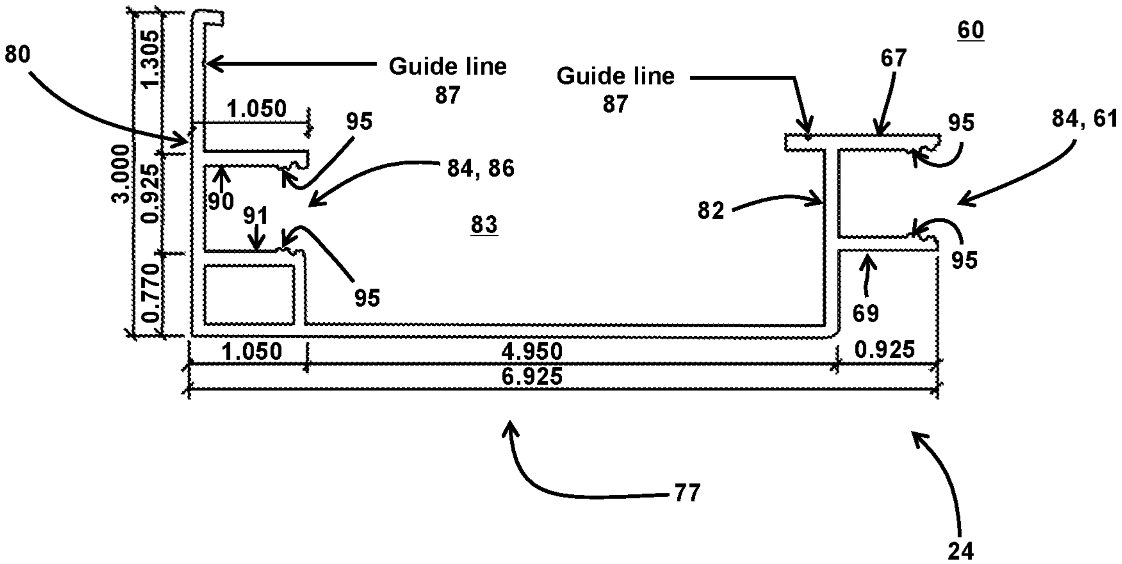
FIG. 3E illustrates a fourth example cross sectional profile for the gutter of the louvered patio cover, in accordance with one or more implementations.

FIGS. 3A, 3B, 3C, 3D, and 3E illustrate example cross sectional profiles of a gutter 24. FIG. 3A illustrates a first example cross sectional profile 70. FIG. 3B illustrates a second example cross sectional profile 72. FIG. 3C is an enlarged view of a portion 74 of cross sectional profiles 70 and 72. FIG. 3D illustrates a third example cross sectional profile 75. FIG. 3E illustrates a fourth example cross sectional profile 77. It should be noted that FIG. 3A-3E illustrate several example dimensions (in inches) for profiles 70, 72, 75, and 77, and portion 74. These dimensions are examples only, and are not intended to be limiting. Gutters 24 may have these dimensions or any other dimensions that allow gutters 24 to function as described herein.

As shown in FIGS. 3A, 3B, 3D, and 3E, gutter 24 may comprise a surface 80 configured to be coupled with a support beam 14 (not shown in FIG. 3A-3E), an opposite surface 82 oriented toward area 60 within the louvered patio cover 10 (not shown in FIG. 3A-3E), an interior portion 83, one or more lighting channels 84, and/or other components. Gutter 24 may include guide lines 87, orifices, and/or other features that facilitate alignment and/or attachment to other components of frame 12 (FIG. 1) and/or louvered patio cover 10 (FIG. 1). Gutter 24 may be configured to hold a light source in one or more lighting channels 84 for lighting an area under, within, and/or around louvered patio cover 10. In some implementations, gutter 24 may comprise one lighting channels 86 (e.g., as shown in FIGS. 3A, 3B, 3D, and 3E) that may open toward interior 83 of gutter 24, for example. In some implementations, interior 83 may be configured to reflect and/or otherwise scatter light from the light source to enhance the light provided by the light source. In some implementations, gutter 24 may comprise two lighting channels (e.g., as shown in FIGS. 3A, 3D, and 3E), with lighting channel 86 opening toward interior 83 of gutter 24, and a second lighting channel opening in a different direction. For example, FIG. 3A illustrates a second lighting channel 88 opening toward a ground surface below louvered patio cover 10 when gutter 24 is coupled to frame 12 (FIG. 1). FIG. 3D also illustrates a second lighting channel 89 opening toward a ground surface below louvered patio cover 10 when gutter 24 is coupled to frame 12 (FIG. 1), but channel 89 is located on an opposite side of gutter 24 compared to lighting channel 86. FIG. 3E illustrates a second lighting channel 61 opening toward area 60 within the louvered patio cover 10 (FIG. 1) when gutter 24 is coupled to frame 12.

In some implementations, lighting channels 86, 88, 89, and/or 61 may have two substantially parallel sides (e.g., 90 and 91 in channel 86, 92 and 93 in channel 88, 63 and 65 in channel 89, and 67 and 69 in channel 61), and another side that has a perpendicular orientation relative to the two parallel sides (e.g., 80 in channel 86, 91 in channel 88, 59 in channel 89, and 82 in channel 61). In some embodiments (e.g., as shown in FIG. 3A) lighting channels 86 and 88 may share a common wall. In the example shown in FIG. 3A, the shared common wall is formed by side 91. As described above, side 91 form a parallel side of channel 86 and a perpendicular side of channel 88. These examples are not intended to be limiting. Channels 86, 88, 89, and/or 61 may have sides with other orientations (e.g., substantially "U" shaped, etc.) that allow channels 86, 88, 89, and/or 61 to function as described herein.

In some implementations, channels 86, 88, 89, and/or 61 may include lighting tracks 95 configured to receive and hold a light source in channel 86, 88, 89, and/or 61. Tracks 95 may be formed in corresponding pairs on opposite sides of a given channel 86, 88, 89, and/or 61 (e.g., in the two parallel sides), and/or have other configurations. Tracks 95 may be configured to slidably receive a light source such that the light source may be removed from, and/or replaced in channel 86, 88, 89, and/or 61. An example lighting track 95 profile 97 is illustrated in FIG. 3C. In this example, profile 97 is formed by two side by side protrusions that form a groove or depression therebetween. Other lighting track 95 profiles 97 are contemplated.

In some implementations, lighting track 95 is configured to hold a diffuser lens (described herein) and/or other components. Advantageously, lighting track 95 is configured to accommodate various different light fixtures (e.g., it is not specifically designed for one certain light fixture. In some implementations, lighting track may be configured such that a light fixture (e.g., and LED tape) may be mounted on the back of a channel (e.g., 86 and/or 88) and/or otherwise in the channel, facing the diffuser lens to facilitate disbursement of light through the diffuser lens.

In some implementations, gutters 24 may include one or more light diffusers configured to removably couple with channels 86, 88, 89, and/or 61. FIGS. 4A, 4B, and 4C illustrate light diffusers 100. FIG. 4A illustrates two different light diffusers 100 coupled to channels 86 and 88 (which may similarly be coupled to channels 89 and/or 61) of a gutter 24. Light diffusers 100 may be coupled to channels 86 and/or 88 (and/or channels 89, 61) at or near an open side of channel 86 or 88 (and/or channels 89, 61). Light diffusers 100 may be configured to enclose channels 86 or 88 (and/or channels 89, 61). Light diffusers 100 may be configured to cover a light source in channel 86 or 88 (and/or channels 89, 61). Light diffusers 100 may be configured to pass and/or diffuse light from a light source in channel 86 or 88 (and/or channels 89, 61) into the ambient environment. Light diffusers 100 may be formed from transparent and/or translucent material. Light diffusers 100 may be formed in one or more colors and/or have other properties. Light diffusers 100 may be formed from acrylic and/or other polymers, and/or other materials.

FIG. 4B illustrates how a light diffuser 100 may be configured to flex 102 to facilitate placement in channel 86 or 88 (FIG. 4A) (and/or channels 89, 61). FIG. 4B illustrates a first view 104 of light diffuser 100 in a rest position, and a second view 106 of light diffuser 100 is a flexed position.

As shown in FIG. 4B, in some implementations, light diffuser 100 may have a body 108 and legs 110 extending from body 108. In some implementations, legs 110 both extend from body 108 on the same side of body 108. Body 108 may be configured to diffuse light from a light source. In the example shown in FIG. 4B, body 108 includes an undulating inner surface 111, and a smooth arcuate outer surface 113. Light diffuser 100 may be configured with these and/or other features configured to enhance light diffusion through light diffuser 100, for example.

Legs 110 may be configured to be inserted into channels 86 or 88 (and/or channels 89, 61) and hold light diffuser 100 in channel 86 or 88 (and/or channels 89, 61). For example, legs 110 may be formed from a resilient material, and/or body 108 and/or legs 110 may be configured with a resilient design, that resists deflection. As shown in view 106, legs 110 may be deflected toward each other, so that legs 110 will fit within channel 86 or 88 (and/or channels 89, 61). Once inserted within channel 86 or 88 (and/or channels 89, 61), legs 110 may attempt to return to their undeflected position (e.g., because they are formed from a resilient material, or light diffuser 100 is configured with a resilient design). Legs 110 may be configured to engage the sides of a channel 86 or 88 (e.g., due to outward pressure created by legs 110 attempting to return to their undeflected position) and hold light diffuser 100 in place against the sides of channel 86 or 88 (and/or channels 89, 61).

FIG. 4C illustrates several example dimensions (in inches) of a light diffuser 100, in accordance with one or more implementations. These dimensions are examples only, and are not intended to be limiting. Light diffusers 100 may have these dimensions or any other dimensions that allow light diffusers 100 to function as described herein.

Returning to FIG. 1, louvered panels 18 may be configured to block or reduce an amount of ambient light that passes through frame 12 into an interior of louvered patio cover 10. Louvered panels 18 may be configured to at least partially block elements (e.g., light, precipitation, wind, etc.) of the ambient environment from reaching the interior of louvered patio cover 10. Louvered panels 18 may be opaque, translucent, and/or transparent. Louvered panels 18 may be formed from polymers, wood, metal, and/or other materials. Individual louvered panels 18 may be configured to be suspended in parallel between support beams 14 across frame 12, above the interior of louvered patio cover 10. Louvered panels 18 may be rotatably coupled to support beams 14 so that louvered panels 18 may rotate relative to support beams 14. In some implementations, louvered panels 18 may have an elongated, generally rectangular shape, and/or other shapes. Louvered panels 18 may be rotatably coupled to support beams 14 at either and/or both ends of a given louvered panel 18. Louvered patio cover 10 may be configured with any number of louvered panels 18, having any dimensions that allow louvered patio cover 10 to function as described herein.

Actuator 22 may be mounted to frame 12 and coupled to louvered panels 18. Actuator 22 may be mounted to frame 12 in any location that facilitates coupling with louvered panels 18. In some implementations, actuator 22 may be coupled to louvered panels 18 via one or more actuator arms 25. Actuator 22 may include one or more actuator arms 25, a motor, and/or other components. In some implementations, one or more actuator arms 25 may include rotating joints, bearings, hinges, and/or other components that facilitate coupling actuator 22 to louvered panels 18 and/or movement of louvered panels 18 by actuator 22. Actuator 22 may be configured to rotate louvered panels 18 between an open configuration and a closed configuration (and/or intermediate configurations between the open configuration and the closed configuration). Actuator 22 may be configured such that the open configuration allows ambient light (and/or other elements of the ambient environment) to pass between louvered panels 18, and the closed configuration blocks light (and/or the other elements of the ambient environment) from passing between louvered panels 18. In some implementations, actuator 22 may be configured to rotate individual louvered panels 18 in unison between the open configuration and the closed configuration.

In some implementations, louvered patio cover 10 may be assembled with various assembly operations. In some implementations, the assembly operations may be implemented via machining methods, and/or other manufacturing methods. In some implementations, one or more of the components of louvered patio cover 10 may be machined and/or otherwise formed from stock material. Machining may include stamping, pressing, heat treating, cutting, turning, milling, drilling, broaching, bending, and/or other machining operations. In some implementations, the general shapes of the components of louvered patio cover 10 may be formed by one or more of these processes, for example. In some implementations, the components of louvered patio cover 10 may be coupled together using various coupling devices. The coupling devices may include screws, nuts, bolts, adhesive, washers, fittings, bearings, slots, hooks, clamps, clips, nails, complimentary alignment features, friction fits, and/or other coupling devices.

The assembly operations described below are intended to be illustrative. In some implementations, assembly may be accomplished with one or more additional operations not described, and/or without one or more of the operations discussed. Additionally, the order in which the assembly operations are is not intended to be limiting.

The assembly operations may include assembling frame 12. Frame 12 may be assembled using support beams 14, support beam couplers 20, and/or other components. As described above, support beams 14 may have angled ends relative to elongated bodies of support beams 14. Support beams 14 may be hollow, generally rectangular in cross sectional shape, and/or have other characteristics. A support beam coupler 20 may comprise first and second receivers (FIG. 2A). The first receiver may be configured to receive an angled end of a first support beam. The second receiver may be configured to receive an angled end of a second support beam. The angled ends of the first and second support beams may face or abut each other when received by the first and second receivers. In some implementations, the first and second receivers may be located on adjacent surfaces of a support beam coupler 20. In some implementations, support beam coupler 20, and the first and second support beams may be assembled to conceal support beam coupler 20 when viewed from an area within louvered patio cover 10.

The assembly operations may include installing support posts 16 in or on a ground surface and coupling frame 12 to support posts 16. Support posts 16 may be vertically oriented, for example. In some implementations, support beams 14 may be horizontally oriented and supported by vertically oriented support posts 16. In some implementations, a support beam coupler 20 may be attached to a vertically oriented support post 16. In some implementations, the one or more support beam couplers 20 may be located at corners of frame 12, at or near a location where frame 12 is supported by posts 16.

The assembly operations may include rotatably coupling louvered panels 18 to support beams 14. The assembly operations may include mounting actuator 22 to frame 12 and coupling actuator 22 to louvered panels 18. Louvered panels 18 and/or actuator 22 may be coupled to support beams 14 and/or frame 12 before or after frame 12 is coupled to support posts 16. Actuator 22 may be configured to rotate louvered panels 18 between an open configuration and a closed configuration (and/or intermediate configurations between the open configuration and the closed configuration). Actuator 22 may be configured such that the open configuration allows ambient light to pass between louvered panels 18, and the closed configuration blocks light from passing between louvered panels 18. In some implementations, actuator 22 may be configured to rotate individual louvered panels 18 in unison between the open configuration and the closed configuration.

The assembly operations may include coupling one or more gutters 24 to frame 12 and/or other components of louvered patio cover 10. Gutters 24 may be coupled to support beams 14 and/or frame 12 before or after frame 12 is coupled to support posts 16. A gutter 24 may comprise a lighting channel and/or other components. The assembly operations may include installing a light source in the gutter lighting channel. The light source may be used for lighting an area in, under, and/or around louvered patio cover 10. In some implementations, gutter 24 may be coupled such that the lighting channel may open toward an interior of gutter 24. In some implementations, gutter 24 may comprise two lighting channels, installed with a first lighting channel opening toward an interior of the gutter, and a second lighting channel opening toward a ground surface below louvered patio cover 10 when gutter 24 is coupled to frame 12.

In some implementations, the assembly operations may include coupling a cornice (FIG. 2A) to one or more support beams 14. The cornice may be decorative and/or have other functions.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A louvered patio cover comprising:

a frame configured to be coupled to support posts, the frame comprising support beams;

louvered panels coupled to the support beams;

support beam couplers, a support beam coupler of the support beam couplers comprising first and second receivers, the first receiver configured to receive an angled end of a first support beam of the support beams, and the second receiver configured to receive an angled end of a second support beam of the support beams, such that the angled ends of the first and second support beams face each other when received by the first and second receivers; and cap connections configured to couple the support beam couplers to the support posts, a given cap connection of the cap connections comprising a planar surface configured to couple to an end of a corresponding support post between the support post and the support beam coupler.

2. The cover of claim 1, further comprising one or more gutters coupled to the frame, a gutter of the one or more gutters comprising a lighting channel with parallel sides, each side of the parallel sides comprising a light track formed by a protrusion from that side, the lighting tracks on the parallel sides configured to hold a light source for lighting an area under the louvered patio cover.

3. The cover of claim 2, wherein the lighting channel opens toward an interior of the gutter.

4. The cover of claim 2, wherein the gutter comprises two lighting channels, with a first lighting channel opening toward an interior of the gutter, and a second lighting channel opening toward a ground surface below the louvered patio cover when the gutter is coupled to the frame.

5. The cover of claim 4, wherein the two lighting channels share a common wall.

6. The cover of claim 2, wherein the gutter is coupled to the frame on an interior surface of a support beam.

7. The cover of claim 6, wherein the interior surface of the support beam faces an area of an ambient environment covered by the louvered panels.

8. The cover of claim 1, further comprising an actuator mounted to the frame and coupled to the louvered panels, the actuator configured to rotate the louvered panels to allow ambient light to pass between the louvered panels, or block light from passing between the louvered panels.

9. The cover of claim 1, wherein the support posts are vertically oriented and configured to support the frame, wherein the support beam coupler is attached to a vertically oriented support post via a corresponding cap connection.

10. The cover of claim 9, wherein the support beam couplers are located at corners of the frame.

11. The cover of claim 10, wherein the first and second support beams are horizontally oriented and are supported by the vertically oriented support posts.

12. The cover of claim 1, wherein the first and second receivers are located on adjacent surfaces of the support beam coupler, wherein the first and second receivers each comprise pairs of tabs or plates with a pair of tabs or plates from the first receiver intersecting a pair of tabs or plates from the second receiver.

13. The cover of claim 1, wherein the first and second support beams conceal the support beam coupler when viewed from an area within the louvered patio cover.

14. The cover of claim 1, further comprising a cornice coupled to an upper side of one or more of the support beams of the frame.

15. A louvered patio cover comprising:

a frame configured to be coupled to support posts, the frame comprising support beams, the support beams having angled ends;

louvered panels, the louvered panels rotatably coupled to the support beams;

support beam couplers, a support beam coupler of the support beam couplers comprising first and second receivers, the first receiver configured to receive an angled end of a first support beam of the support beams, and the second receiver configured to receive an angled end of a second support beam of the support beams, such that the angled ends of the first and second support beams face each other when received by the first and second receivers; and one or more gutters coupled to a lower side of one or more of the support beams of the frame, a gutter of the one or more gutters comprising a lighting channel configured to hold a light source for lighting an area under the louvered patio cover, each side of the lighting channel comprising a light track formed by two rounded side by side protrusions from that side that form a groove or depression therebetween, the light tracks configured to hold the light source.

16. The cover of claim 15, wherein the sides of the lighting channel are parallel.

17. The cover of claim 15, wherein the lighting channel opens toward an interior of the gutter.

18. The cover of claim 15, wherein the gutter comprises two lighting channels, with a first lighting channel opening toward an interior of the gutter, and a second lighting channel opening toward a ground surface below the louvered patio cover when the gutter is coupled to the frame.

19. The cover of claim 18, wherein the two lighting channels share a common wall.

20. The cover of claim 15, wherein the gutter is coupled to the frame on an interior surface of a support beam, and wherein the interior surface of the support beam faces an area of an ambient environment covered by the louvered panels.

* * * * *